United States Patent
Steinlauf et al.

(10) Patent No.: US 10,691,746 B2
(45) Date of Patent: Jun. 23, 2020

(54) IMAGES FOR QUERY ANSWERS

(71) Applicant: Google LLC, Mountain View, CA (US)

(72) Inventors: Eric Steinlauf, Cambridge, MA (US);
Grant Dasher, Cambridge, MA (US);
Matthew K. Gray, Reading, MA (US);
Steven D. Baker, Palo Alto, CA (US);
Namrata U. Godbole, Cambridge, MA (US); Samer Hassan Hassan, San Jose, CA (US); Ionut Georgescu, San Francisco, CA (US)

(73) Assignee: Google LLC, Mountain View, CA (US)

( * ) Notice: Subject to any disclaimer, the term of this patent is extended or adjusted under 35 U.S.C. 154(b) by 114 days.

(21) Appl. No.: 15/208,345

(22) Filed: Jul. 12, 2016

(65) Prior Publication Data

US 2017/0017668 A1 Jan. 19, 2017

Related U.S. Application Data

(60) Provisional application No. 62/191,987, filed on Jul. 13, 2015.

(51) Int. Cl.
*G06F 16/58* (2019.01)
*G06F 16/332* (2019.01)
(Continued)

(52) U.S. Cl.
CPC ...... *G06F 16/5866* (2019.01); *G06F 16/3325* (2019.01); *G06F 16/3329* (2019.01); *G06F 16/951* (2019.01); *G06F 16/9538* (2019.01)

(58) Field of Classification Search
None
See application file for complete search history.

(56) References Cited

U.S. PATENT DOCUMENTS 7,460,735 B1 12/2008 Rowley
8,538,943 B1 9/2013 Bau
(Continued)

FOREIGN PATENT DOCUMENTS

CN 103229223 4/2009
CN 101878476 11/2010
(Continued)

OTHER PUBLICATIONS

Theune et al., "Questions, Pictures, Answers: Introducing Pictures in Question-Answering Systems." Retrieved from the Internet <URL: http://wwwhome.cs.utwente.nl/~theune/PUBS/Questions_Pictures_Answers.pdf>, 15 pages, 2006.
(Continued)

*Primary Examiner* — Charles D Adams
(74) *Attorney, Agent, or Firm* — Fish & Richardson P.C.

(57) ABSTRACT

Methods and systems for providing an image with an answer to a question query. A method receiving a first query that is determined to be a question query; generating a second query form the first query; causing a search of a plurality of resources of a first corpus using the second query as input, wherein the first corpus of resources are resources that include images and textual data rendered with the images; receiving data indicating a set of resources determined to be responsive to the second query; causing a search for images in the set of resources; selecting, from the set of images and based in part on the search for images in the first set of resources, an image to be provided with the answer in response to the query; and providing, by the data processing apparatus, and with the answer, the image in response to the first query.

13 Claims, 6 Drawing Sheets

(51) Int. Cl.
*G06F 16/9538* (2019.01)
*G06F 16/951* (2019.01)

(56) References Cited

U.S. PATENT DOCUMENTS

| | | | |
|---|---|---|---|
| 8,819,006 B1 | 8/2014 | Chechik | |
| 9,026,526 B1* | 5/2015 | Bau | G06F 17/30867 |
| | | | 382/305 |
| 9,043,268 B2 | 5/2015 | Backer | |
| 2003/0069980 A1 | 4/2003 | Picca | |
| 2007/0073651 A1 | 3/2007 | Imielinski | |
| 2008/0098300 A1* | 4/2008 | Corrales | G06F 17/30864 |
| | | | 715/243 |
| 2009/0327235 A1 | 12/2009 | Coladonato | |
| 2011/0087673 A1 | 4/2011 | Chen | |
| 2011/0191336 A1 | 8/2011 | Wang et al. | |
| 2012/0078891 A1 | 3/2012 | Brown et al. | |
| 2013/0007033 A1 | 1/2013 | Brown | |
| 2014/0358889 A1 | 12/2014 | Shmiel | |
| 2015/0161268 A1 | 6/2015 | Dasher et al. | |
| 2015/0169738 A1* | 6/2015 | Duerig | G06K 9/6256 |
| | | | 707/749 |
| 2015/0186534 A1* | 7/2015 | Chechik | G06F 17/30864 |
| | | | 707/728 |

FOREIGN PATENT DOCUMENTS

| | | |
|---|---|---|
| CN | 103229223 | 7/2013 |
| CN | 104376114 | 2/2015 |
| KR | 2007018388 A1 | 2/2007 |
| WO | WO 2007098008 | 8/2007 |
| WO | WO2009002864 A1 | 12/2008 |

OTHER PUBLICATIONS

Image Retrieval Supports Multimedia Authoring. Oct. 3, 2005 [Retrieved on Sep. 27, 2016 from http;//doc.utwente.nl/65567/1/lecems05.pdf].

International Search Report and Written Opinion in International Application No. PCT/US2016/041913, dated Oct. 3, 2016, 9 pages.

EP Extended European Search Report issued in European Application No. 16825045.4, dated Jun. 14, 2018, 14 pages.

European Office Action in European Application No. 16825045, dated Nov. 19, 2019, 8 pages.

CN Office Action in Chinese Application No. 201680012847.9, dated Mar. 4, 2020, 19 pages (with English translation).

* cited by examiner

IMAGES FOR QUERY ANSWERS

CLAIM OF PRIORITY

This application claims priority under 35 USC § 119(e) to U.S. patent application Ser. No. 62/191,987, filed on Jul. 13, 2015 the entire contents of which are hereby incorporated by reference.

BACKGROUND

This specification relates to search system query processing.

The Internet provides access to a wide variety of resources, such as image files, audio files, video files, and web pages. A search system can identify resources in response to queries submitted by users and provide information about the resources in a manner that is useful to the users.

Users of search systems are often searching for an answer to a specific question, rather than a listing of resources. For example, users may want to know what the weather is in a particular location, a current quote for a stock, the capital of a state, etc. When queries that are in the form of a question are received, some search systems may perform specialized search operations in response to the question format of the query. For example, some search systems may provide information responsive to such queries in the form of an "answer," such as information provided in the form of a "one box" to a question.

SUMMARY

In general, one innovative aspect of the subject matter described in this specification can be embodied in methods that include the actions of receiving, by the data processing apparatus, a first query that is determined to be a question query for which a corresponding answer is to be provided in response to the first query; generating, by the data processing apparatus and from the first query, a second query; causing, by the data processing apparatus, a search of a plurality of resources of a first corpus of resources to be done using the second query as input, wherein the first corpus of resources are resources that include images and textual data rendered with the images; receiving data indicating a set of resources determined to be responsive to the second query and ranked according to a first order indicative of the responsiveness to the query; causing a search for images in the set of resources; selecting, from the set of images and based in part on the search for images in the first set of resources, an image to be provided with the answer in response to the query; and providing, by the data processing apparatus, and with the answer, the image in response to the first query. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Images are provided with an answer to a question, and the image is selected such that it conveys to the user information regarding both the content of the question and the answer. This helps ensure that images provided to the user for an answer is responsive to the question and consistent with the answer provided.

In some implementations in which an image is to be provided from a same resource from which an answer is extracted (referred to as a "source resource"), the system scores images in response to a query prior to receiving data indicating the resource from which the answer is extracted. Thus, when the source resource is identified, the images of the source resource may be selected more quickly than waiting for the source resource to be identified before scoring the images. This reduces the overall latency of image selection for answer, thereby improving the process of providing an image with an answer to a question query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Overview

Figure 1:
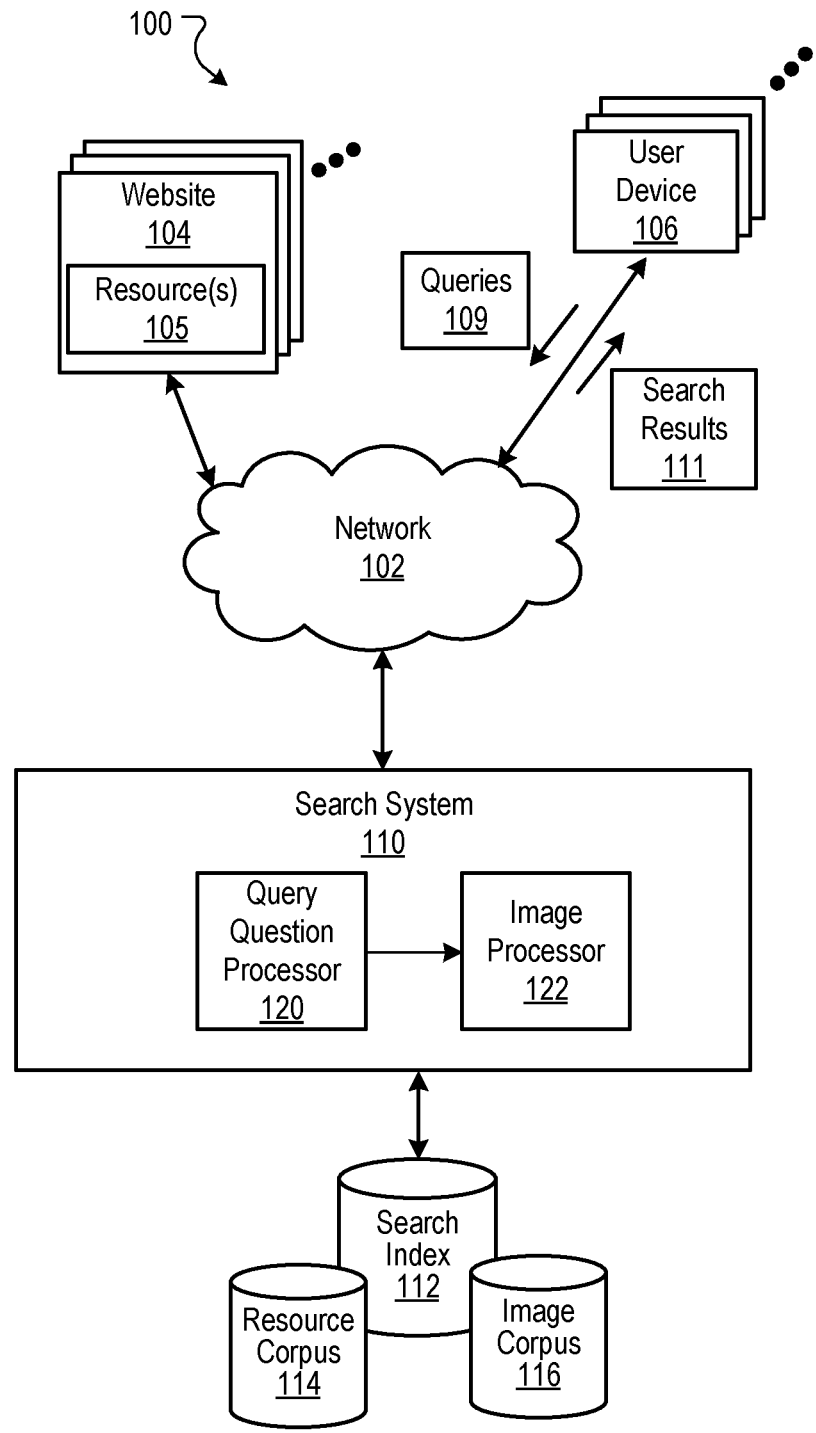
FIG. 1 is an illustration of an environment in which an image is provided with an answer to a question query.

Users often use search systems to seek for "answers" rather than a breadth of information. An answer is a fact or relation that is responsive to a question. A "question query" differs from an informational query in that the question query seeks the answer, while the informational query is a request for a variety of different types of information for a subject. For example, the question query "How high is Pikes Peak" is a structured query that clearly requests a fact—the height of Pikes Peak. A search system can detect the structured nature of the query and interpret the query as a question query, and provide, in response to the query, a particular result that provides an answer to the question, and optionally other results.

The subject matter of this document relates to a system that identifies relevant images to display with a textual answer to a question query. In operation, the system receives a query. If the query is of the type that triggers a textual answer, i.e., a "question query," the system does the following image-seeking answer process. First, the system generates an image query for an image search based on the question query. The image query is based on an identified subject of the query, if the subject is of a type that is definitional (e.g., a specific instance of a class, a particular person, etc., such as "How fast can a Cheetah run?" where "Cheetah" is the subject). If the question query is not definitional (e.g., for the query "what is the fastest animal," the term "animal" is not a specific instance, it is a class) then the query received is used as the question query.

In some implementations, the question query is used to search a web corpus of web page resources. For the top N resources returned in response to the second query, a separate search is then run for images in the top N resources to identify a set of images. Again, the image query may be used for this subsequent search as the input query. Accordingly, the image query is used to find a set of web page resources and is then used to find images in a search constrained to the web page resources.

The top ranked image may then be used as an image to be provided with the answer. In other implementations, however, additional processing can be done to refine the image selection. For example, the system may determine the source resource from which the corresponding answer was extracted. If the source resource is among the top N resources, and includes one or more images in the set of images, then the image in the source resource having a highest rank in the set of images is selected. Alternatively, additional selection processing can be done, such as further ranking the images included in the source resource according to selection criteria. The selection criteria can include, for example, whether the image is in a prominent position on the page; whether the image is identified as a low-information image (e.g., "clipart," or anchor buttons, icons, etc.,), and so on. The top ranked image is then selected provided with the answer text.

If the source resource does not include images, then no image may be provided with the answer, or, alternatively, the selection of an image may be expanded to images in the set of images that were determined to be responsive to the question query.

By pre-processing an image search before the source resource is identified, the system reduces latency, as image scoring for images in the source resource is completed by the time the source resource is identified by a separate answer generation system.

When higher latency can be tolerated, the system can wait until the source resource is identified, and then score images included in the source resource. If the source resource does not include images, then no image may be provided with the answer, or, alternatively, the search may be expanded to images from resources that are responsive to the question query. In still other implementations, resulting answer text can be used to search the top ranked resources that are identified in response to the image query.

These features and additional features are described in more detail in the sections that follow. The features are described in the context of images; however, the features are not limited to applications only in the context of images, and may also be applied to other content types, such as video and audio.

Example Operating Environment

FIG. 1 is an illustration of an environment 100 in which an image is provided with an answer to a question query. A computer network 102, such as the Internet, connects publisher websites 104, user devices 106, and a search system 110. The online environment 100 may include many thousands of publisher websites 104 and user devices 106.

A publisher website 104 includes one or more resources 105 associated with a domain and hosted by one or more servers in one or more locations. Generally, a website is a collection of web pages formatted in hypertext markup language (HTML) that can contain text, images, multimedia content, and programming elements, for example, scripts. Each web site 104 is maintained by a content publisher, which is an entity that controls, manages and/or owns the website 104.

A resource is any data that can be provided by a publisher website 104 over the network 102 and that has a resource address, e.g., a uniform resource locator (URL). Resources may be HTML pages, electronic documents, images files, video files, audio files, and feed sources, to name just a few. The resources may include embedded information, e.g., meta information and hyperlinks, and/or embedded instructions, e.g., client-side scripts.

A user device 106 is an electronic device that is under the control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102. The web browser can enable a user to display and interact with text, images, videos, music and other information typically located on a web page at a website.

To facilitate searching of these resources 105, the search system 110 crawls the publisher websites 104 and indexes the resources provided by the publisher websites 104. The index data are stored in a resource index 112. The index 112 may index multiple corpora, such as a web page resource corpus 114, an image corpus 116, and other corpora. Each corpus may be searched separately by the search system 110 using search processes that are designed for the particular corpus being searched.

The user devices 106 submit search queries to the search system 110. In response to the search request, the search system 110 uses the index 112 to identify resources that are relevant to the queries. The search system 110 identifies the resources in the form of search results and returns the search results to the user devices 106 in a search results page resource. A search result is data generated by the search system 110 that identifies a resource or provides information that satisfies a particular search query. A search result for a resource can include a web page title, a snippet of text extracted from the web page, and a resource locator for the resource, e.g., the URL of a web page.

The search results are ranked based on scores related to the resources identified by the search results, such as information retrieval ("IR") scores, and optionally a separate ranking of each resource relative to other resources (e.g., an authority score). The search results are ordered according to these scores and provided to the user device according to the order.

The user devices 106 receive the search results pages and render the pages for presentation to users. In response to the user selecting a search result at a user device 106, the user device 106 requests the resource identified by the resource locator included in the selected search result. The publisher of the website 104 hosting the resource receives the request for the resource from the user device 106 and provides the resource to the requesting user device 106.

Images for Question Queries

As described above, some queries are in the form of question, or in the form of an implicit question. For example, the query "capital of California" is in the form of an implicit question "What is the capital of California?" Likewise, a question query may be explicit, as in the query "What is the capital of California?" The search system 110 includes a query question processor 120 that utilizes processes to determine if a query is a query question, and, if so, whether there is an answer that is responsive to the question. The query question processor 120 can use a variety of different algorithms to determine whether a query is a question and whether there is a particular answer responsive to the question. For example, the query question processor 120 may utilize language models, machine learned processes, knowledge graphs, grammars, the search results and resources referenced by the search results, or combinations thereof, to determine question queries and answers.

When a query is determined to be a question query, the query question processor 120 invokes the image processor 122 which, in turn, identifies an image to be provided with the answer.

Figure 2:
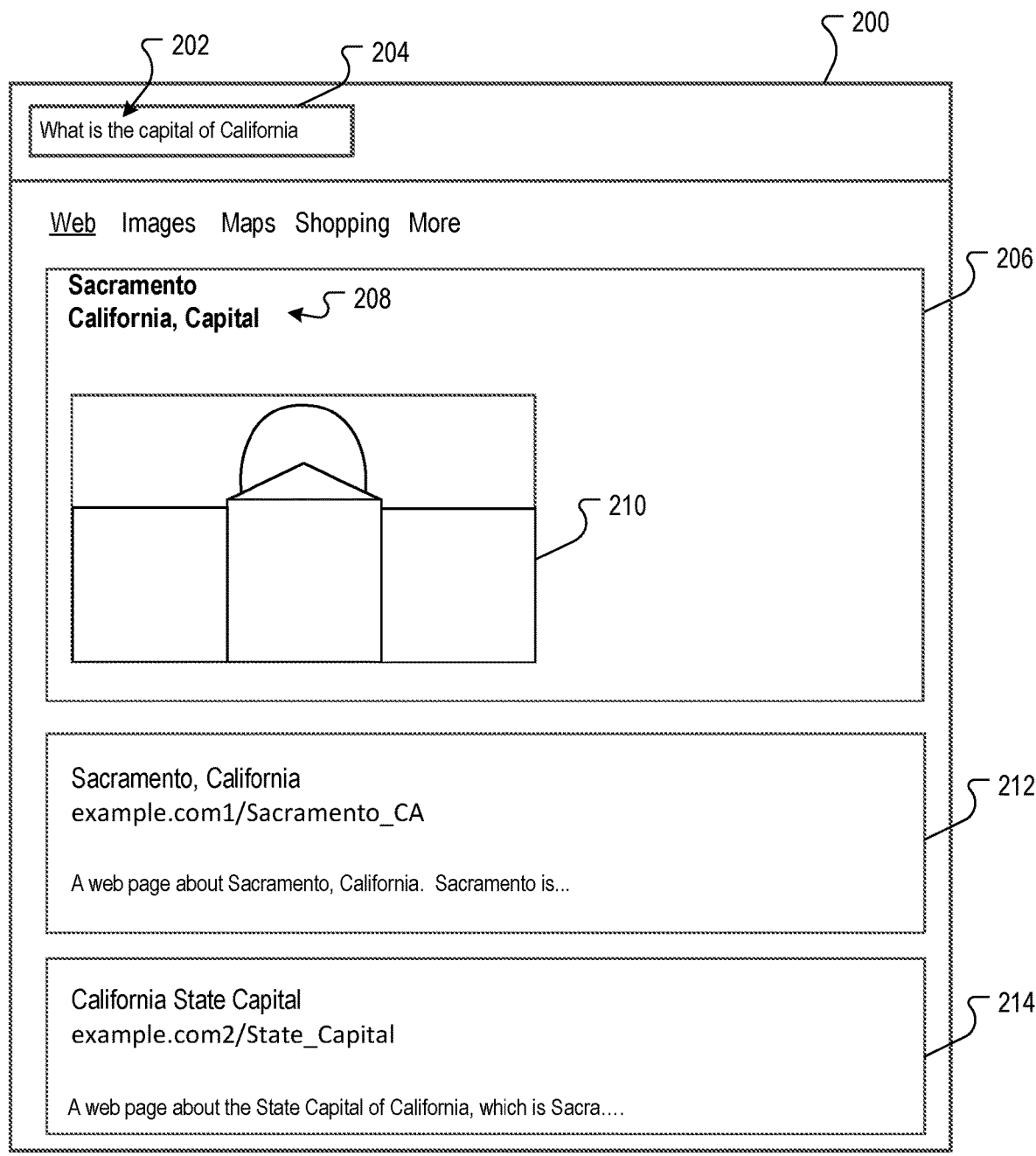
FIG. 2 is an illustration of an example user interface in which an image is provided with an answer to a question query.

FIG. 2 is an illustration of an example user interface 200 in which an image is provided with an answer to a question query. The user interface 200 is a search results interface, and the query 202 "What is the capital of California" has been input in the input field 204. The query question processor 120 identifies the query as a question query, and also identifies the answer "Sacramento." The search system 110, in connection with the query question processor 120, provides an answer box 206 in response to the determination that the query is a question query and that an answer is identified. The answer box 206 includes text data 208 that describes the answer "Sacramento." Additionally, the answer box 206 includes one or more images—in this case, one image 210 that is an image of the capital building of California. Additional information, such as search results 212 and 214, can also be provided on the search results page.

Figure 3A:
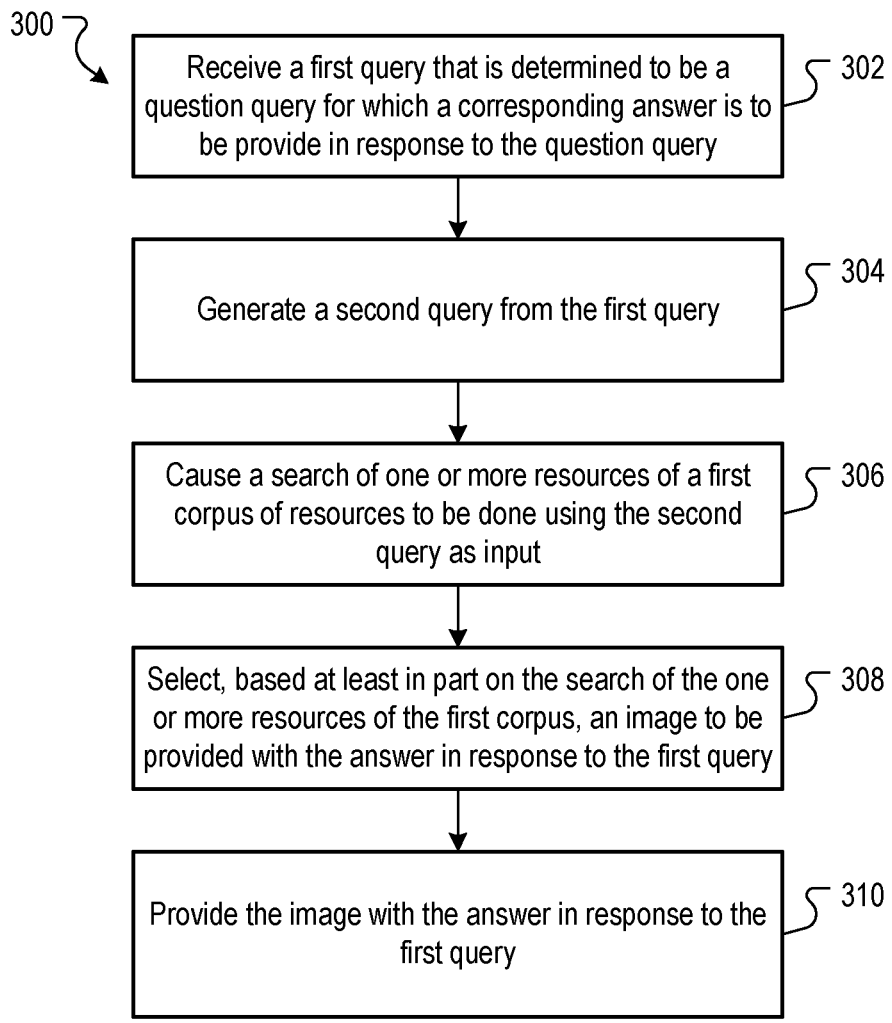
FIG. 3A is a system flow diagram for providing an image with an answer to a question query.

The selection of the image 210 is described with reference to FIG. 3A, which is a system flow diagram 300 for providing an image with an answer to a question query. The system flow diagram 300 describes a process implemented in the image processor 122.

The image processor 122 receives a first query determined to be a question query for which a corresponding answer is to be provided in response to the question query (302). For example, when the query question processor 120 determines a query is a question, e.g., "Capital of California," or "What is the Capital of California," are queries that are determined to be question queries, the question query is provided to the image processor 122.

Figure 4:
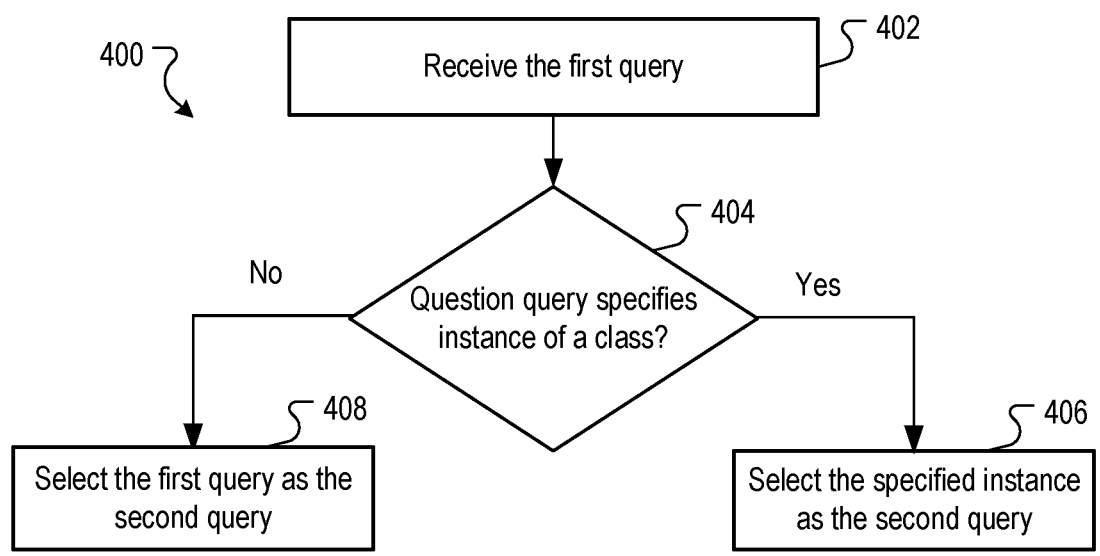
FIG. 4 is a flow diagram of an example process for generating an image query from a question query.

The image processor 122 generates a second query from the first query (304). A variety of processes can be used to derive the second query from the first query. FIG. 4, described below, is a flow diagram of an example process 400 for generating an image query (second query) from a question query (first query).

The image processor 122 causes a search of one or more resources of a first corpus of resources to be done using the second query as input (306). The search is performed by a system external to the image processor 122. In some implementations, the process stage 306 only causes an image search on the source resource from which the answer text is extracted. For example, a source resource may have multiple images, and each of the images are scored by a score that measures the responsiveness of the image to the second query.

In other implementations, a set of resources are searched using the second query, and then images in the top N responsive resources are scored by the second query. Then once the source resource is identified by the query question processor 120, the images may be selected based on the search scores for the second query. While this alternate process may score many images that are not considered after the source resource is determined, it nevertheless reduces latency as the scoring of the images is completed by the time the source resource is identified. This particular implementation is described with reference to FIG. 5 below.

In still other implementations, the set of resources are searched using the second query, and then the images in the top N responsive resources are scored by the second query as above. However, in this implementation, the image that is selected need not be included in the source resource, and is selected independent of the source resource.

The image processor 122 selects, based at least in part on the search of the one or more resources of the first corpus, an image to be provided with the answer in response to the first query (308). As described above, when only the source resource is searched, or when the source resource is identified, the highest ranked image in the source resource may be selected. Alternatively, the highest ranked image from among images scored in the top N resources may instead be selected.

Additional selection criteria may also be used to select an image that has been ranked in response to the second query. For example, such additional selection criteria may include the image location on a rendered resource; image labels for the image in the resource; and whether an image is used as a link. For location criteria, images that are typically rendered in side portions of the resource may be demoted in score relative to images that are rendered in central locations. Other location criteria can also be used.

For image label criteria, images that have labels that indicate the images are frequently included in multiple web page resources, e.g., images labeled as icons, clip-art, UI buttons, bars, and the like, may be demoted as such labels indicate a relatively low informational value. However, for certain question queries in which such labels may indicate a high informational value, the label criteria may be ignored, or, alternatively, may boost the score of the image. For example, if the question relates to icons, e.g., "What is a computer icon," then search scores for the thumbnail images with the "icon" label may be boosted. Likewise, if the question relates to a subject for which clip-art type images are often used, such as in the case of mathematical formulas, then the label icons criteria may be ignored.

For link criteria, images that are used as anchors for links may be ignored, or their scores reduced in value. Other selection criteria can be used to adjust the scores of images in response to the second query, and/or to filter images responsive to the second query.

The search system 110 provides the image with the answer in response to the first query (310). For example, the image with the highest resulting score is selected to be provided with the answer.

Figure 3B:
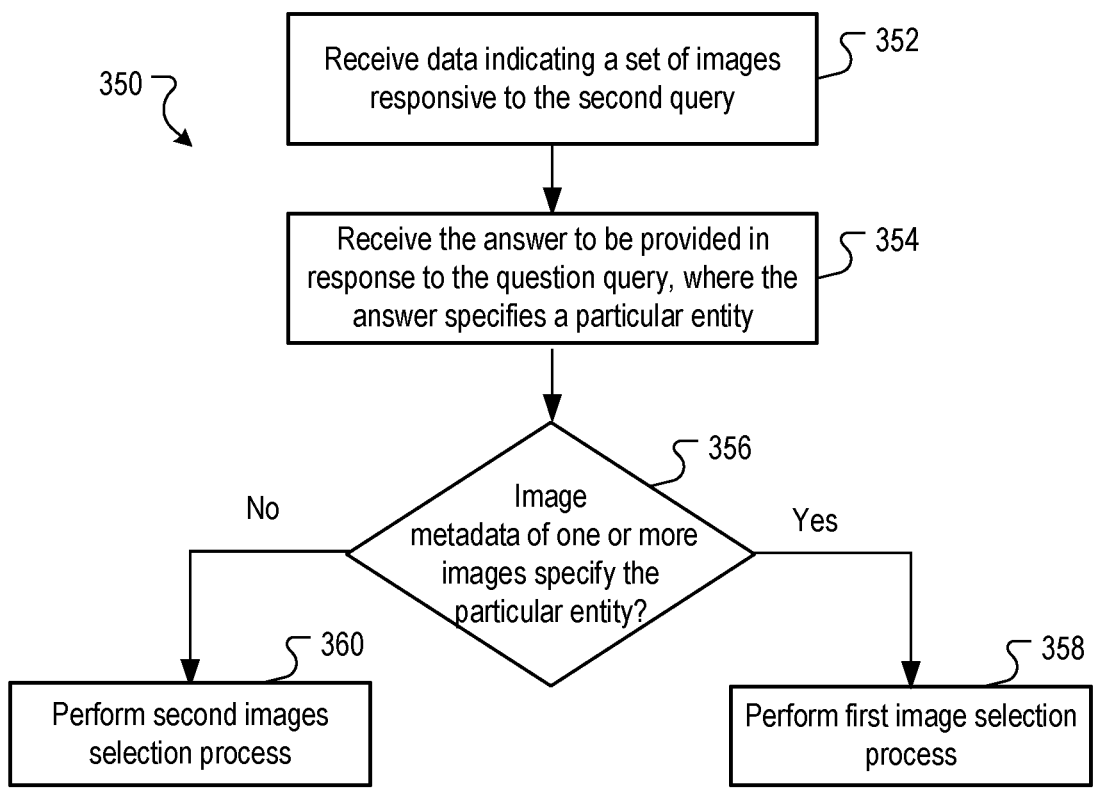
FIG. 3B is a system flow diagram for an example process for scoring images.

In some implementations, the actual answer to be provided may also be used for selection and/or scoring adjustment of images returned for an image search. FIG. 3B is a system flow diagram 350 for an example process 350 for scoring images.

The image processor 122 receives data indicating a set of images responsive to the second query (352). For example, the search system 110 provides a list of images ranked in an order of responsiveness to the second query. The image process 122 can then access the images and metadata describing content of the images.

The image processor 122 receives the answer to be provided in response to the question query, where the answer specifies a particular entity (354). For example, image processor receives the answer text from a query question processing system, and detects, using any appropriate entity detection process, such as name recognizers, language models, grammars and parsers, etc., a particular entity specified by the answer. The particular entity may be a person, place or thing, or a class of persons, places or things, for example.

The image processor 122 determines whether image metadata of one or more images specifies the particular entity (356). The decision process 356 can, for example, take into account each image. For example, the image processor 122 compares the particular entity specified by the answer to image metadata that specifies an entity (or entities) depicted in the image to determine if there is a match. The match may be an exact match, or a matche based on a similarity measure.

If image metadata of one or more images specifies the particular entity, then the image processor 122 performs a first image selection process (358). The first image selection process takes into account, for each image, matches (or lack of matches) of the particular entity specified by the answer to an entity a depicted in the image. The image processing system 122, based on a match or no match, may boost or reduce a relevance sore of the image; or may include or exclude the image from the selection process; or may perform any other appropriate selection process that takes into account the matching (or lack of matching) of the entities.

If, on the other hand, the image metadata of one or more images does not specify the particular entity, then the image processor 122 performs a second image selection process (360). The second image selection process may be any process that can select an image and that need not take into account the matching of an entity specified by the answer to an entity specified for the image.

Second Query Generation

As described above, FIG. 4 is a flow diagram of an example process 400 for generating an image query from a question query. In operation, the image processor 122 receives the first query (402). The first query is a query determined to be a question query.

The image processor 122 determines whether the question query specifies and instance of a class (404). To make this determination, the image processor 122 may use a variety of language models, or access a list of classes and instances that belong to the class. For example, for the query "How fast can a Cheetah run," the image processor 122 can determine, based on language models or pre-specified class/instance data, that the term "Cheetah" is an instance of a class "Animals."

If the query specifies an instance of a class, then the image processor 122 selects the instance as the second query (406). Otherwise, the image processor 122 selects the first query as the second query.

Other ways of determining second queries can also be used. For example, for very popular question queries, a second query may be pre-specified. For example, for the query "How far from the earth is the moon", the second query may be pre-specified as "moon."

In still other implementations, the second query may be the answer text, or a combination of the question query and the answer text. In variations of this implementation, the system may receive an answer that is predicted to be an answer for a question and use the predicted answer as the second query. The predicted answer is not necessarily the actual answer that will be provided in response to the question query. Thereafter, when the system receives the actual answer that will be provided in response to the question query, the system will verify the predicted answer matches (either completely or by satisfying a similarity score) the actual answer. Upon a positive confirmation, the selected image is provided with the actual answer. If the actual answer does not confirm the predicted answer, however, then the system may re-run the searches using the using the actual answer, or, alternatively, may not provide the selected image with the answer text.

The latter implementation is useful for facts that may frequently change. Examples of such changing facts may be relationships among persons, offices held by public officials, positions held by person in organizations, and the like.

Source Resource Processing

Figure 5:
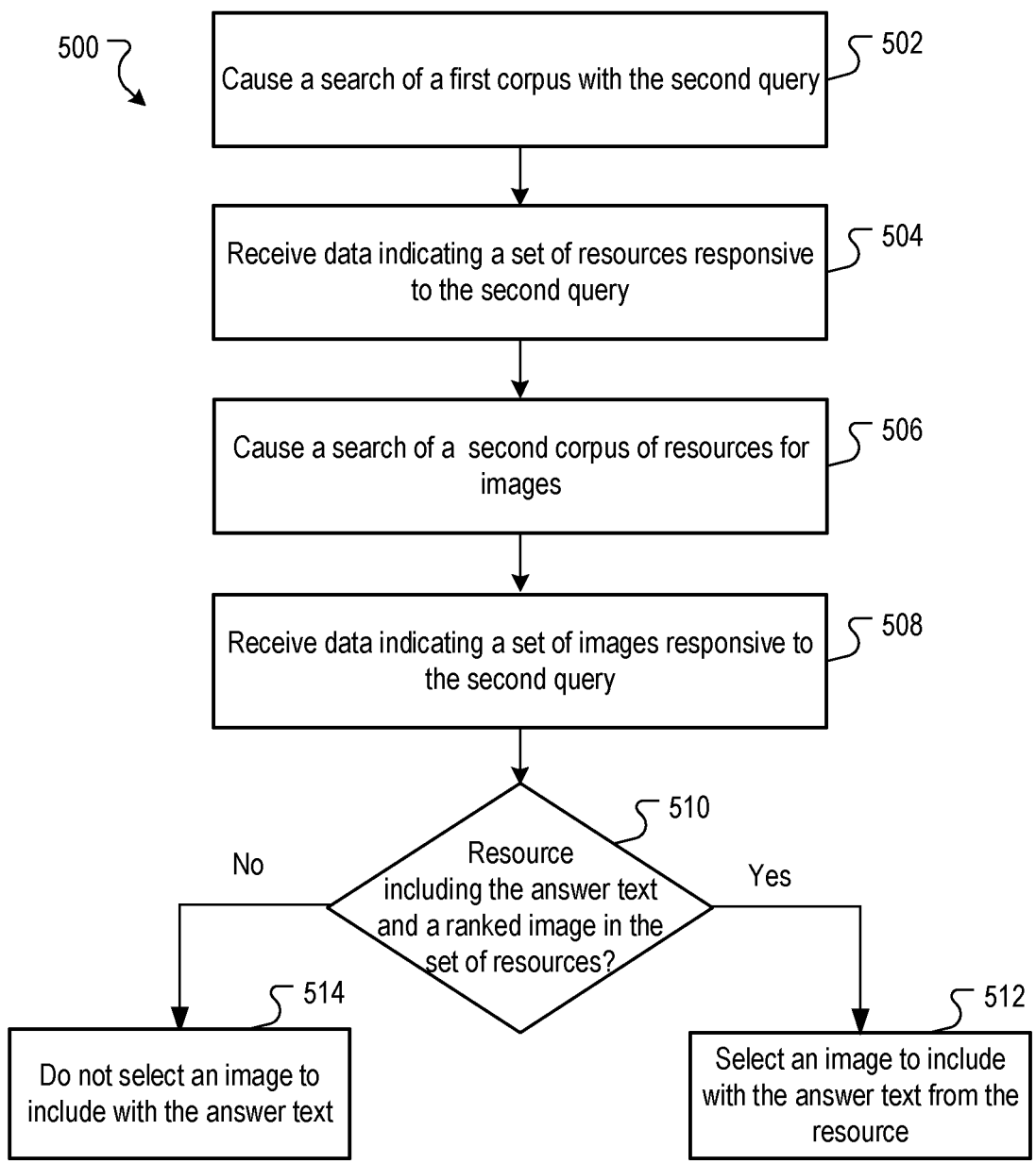
FIG. 5 is a flow diagram of another example process of providing an image with an answer to a question query.

As described above, in one implementation, a set of resources are searched using the second query, and then images in the top N responsive resources are scored by the second query. Thereafter, once the source resource is identified by the query question processor 120, the images may be selected based on the search scores for the second query. FIG. 5 is a flow diagram describing a process 500 that carries out this implementation.

The image processor 122 causes a search of a first corpus with the second query (502). For example, the image processor 122 submits the second query to the search engine 110 to search an index of web page resources.

The image processor 122 receives data indicating a set of resources responsive to the second query (504). For example, the search system 110 provides a list of web resources ranked in an order of responsiveness to the second query.

The image processor 122 causes a search of a second corpus of resources for images (506). For example, the image processor 122 submits the second query to the search engine 110 to conduct an image search constrained over the top N ranked web resources in the set of resources. The value of N may be 100, 500, or some other number.

The image processor 122 receives data indicating a set of images responsive to the second query (508). For example, the search system 110 provides a list of images ranked in an order of responsiveness to the second query.

The image processor 122 determines whether a resource including the answer text and a ranked image is in the set of resources (510). For example, the resource from which the answer is extracted is referred to as the "source resource." The image processor 122 determines whether the source resource is among the top N resources over which the constrained image search was conducted.

If the image processor 122 determines a resource including the answer text and a ranked image is in the set of resources, then the image processor 122 selects an image to include with the answer text from the resource (512). In some implementations, the selections may be based solely on the constituent rankings of the images in the source resource. To illustrate, assume a source resource has five images that have been ranked in response to the second query. The corresponding search scores are 0.78, 0.73, 0.33, 0.31, and 0.08, where the magnitude of the search score is proportional to the responsiveness of the image to the query. Here, the image with the search score of 0.78 would be selected.

In a variation of this implementation, the search scores of the images may be adjusted based on additional selection criteria as described above. The adjustments may be based on a variety of appropriate adjustment formulas, e.g. a location score that is based on the image location in a document may be used to scale the search score.

Conversely, if the image processor 122 determines a resource including the answer text and a ranked image is not in the set of resources, then the image processor 122 does not select an image to include with the answer text (514). Alternately, the image processor 122 may instead select from the images from among the top N resources that were scored based on the second query. The adjustment factors describe above may also be used to adjust the scores.

Additional Implementation Details

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method implemented in a data processing apparatus, comprising:
   receiving, by the data processing apparatus, a first query that is determined to be a question query for which a corresponding answer is to be provided in response to the first query, wherein the corresponding answer is textual data extracted from a source web page resource, and wherein the source web page resource is not yet identified by an answer system for extracting the corresponding answer to serve in response to the first query, wherein the answer system is a system that is separate from the data processing apparatus, and in response:
   generating, by the data processing apparatus and from the first query, a second query;
   causing, by the data processing apparatus, a search of a plurality of resources of a first corpus of web page resources to be done using the second query as input, wherein the first corpus of web page resources are web page resources that, when rendered, include images and textual data rendered with the images;
   receiving data indicating a set of web page resources determined to be responsive to the second query and ranked according to a first order indicative of the responsiveness of the web pages to the second query;
   causing, as part of a search operation responsive to the first query to identify an image to provide with the corresponding answer and that is initiated after the first query is provided and before the source web page resource is identified by the answer system to extract the textual data for the corresponding answer, a search for images that are included in the web pages in the set of web page resources, wherein the search for images is constrained to the images that are included in the web pages in the set of web page resources determined to be responsive to the second query;
   generating, in response to the search for images that are included in the web page resources determined to be responsive to the second query, a set of images from the images that are included in the web pages of the set of web pages, the set of images ranked in a second order indicative of a responsiveness of each image to the second query;
   selecting, from the set of images and based in part on the search for images in the set of web page resources, an image to be provided with the answer in response to the query, the selecting comprising:
      determining, based on data received from the answer system, the source web page resource from which the answer system extracted the corresponding answer from the textual data of the source web page resource in response to receiving the first query; and
      in response to the data received from the answer system, determining that the source web page resource is a resource that is included in the set of web page resources determined to be responsive to the second query and that the source web page resource includes images in the set of images, and in response:
    selecting the image to be provided from among the images in the source web page resource according to the second order indicative of the responsiveness of each image to the second query; and
    providing, by the data processing apparatus, and with the answer, the image in response to the first query.

2. The computer-implemented method of claim 1, wherein causing a search for images in the set of web page resources comprises causing a search for images in the set of web page resources using the second query as input.

3. The computer-implemented method of claim 1, wherein selecting the image to be provided from among the images in the source web page resource according to the second order further comprise:
    further selecting the image to be provided from among the images in the source web page resource according to additional image selection criteria that is separate from the ranking in the second order of the images in the source resource.

4. The computer-implemented method of claim 3, wherein the additional image selection criteria includes image location on a rendered location of the source web page resource, and image labels for the image in the source web page resource.

5. The computer-implemented method of claim 1, wherein generating, from the first query, the second query comprises:
    determining whether the first query identifies a specific instance of an entity class;
    if the query identifies a specific instance of the entity class, selecting the identified specific instance as the second query; or
    if the query does not identify a specific instance of the entity class, selecting the first query as the second query.

6. The computer-implemented method of claim 1, wherein generating, from the first query, the second query comprises selecting the answer as the second query.

7. A system, comprising:
    a data processing apparatus; and
    a computer readable memory system in data communication with the data processing apparatus and storing instructions executable by the data processing apparatus and that upon such execution cause the data processing apparatus to perform operations comprising:
    receiving, by the data processing apparatus, a first query that is determined to be a question query for which a corresponding answer is to be provided in response to the first query, wherein the corresponding answer is textual data extracted from a source web page resource, and wherein the source web page resource is not yet identified by an answer system for extracting the corresponding answer to serve in response to the first query, wherein the answer system is a system that is separate from the data processing apparatus, and in response:
    generating, by the data processing apparatus and from the first query, a second query; causing, by the data processing apparatus, a search of a plurality of resources of a first corpus of web page resources to be done using the second query as input, wherein the first corpus of web page resources are web page resources that, when rendered, include images and textual data rendered with the images;
    receiving data indicating a set of web page resources determined to be responsive to the second query and ranked according to a first order indicative of the responsiveness of the web pages to the second query;
    causing, as part of a search operation responsive to the first query to identify an image to provide with the corresponding answer and that is initiated after the first query is provided and before the source web page resource is identified by the answer system to extract the textual data for the corresponding answer, a search for images that are included in the web pages in the set of web page resources, wherein the search for images is constrained to the images that are included in the web pages in the set of web page resources determined to be responsive to the second query;
    generating, in response to the search for images that are included in the web page resources determined to be responsive to the second query, a set of images from the images that are included in the web pages of the set of web pages, the set of images ranked in a second order indicative of a responsiveness of each image to the second query;
    selecting, from the set of images and based in part on the search for images in the set of web page resources, an image to be provided with the answer in response to the query, the selecting comprising:
        determining, based on data received from the answer system, the source web page resource from which the answer system extracted the corresponding answer from the textual data of the source web page resource in response to receiving the first query; and
        in response to the data received from the answer system, determining that the source web page resource is a resource that is included in the set of web page resources determined to be responsive to the second query and that the source web page resource includes images in the set of images, and in response:
        selecting the image to be provided from among the images in the source web page resource according to the second order indicative of the responsiveness of each image to the second query; and
        providing, by the data processing apparatus, and with the answer, the image in response to the first query.

8. The system of claim 7, wherein causing a search for images in the set of web page resources comprises causing a search for images in the set of resources using the second query as input.

9. The system of claim 8, wherein selecting the image to be provided from among the images in the source web page resource according to the second order further comprise:
    further selecting the image to be provided from among the images in the source web page resource according to additional image selection criteria that is separate from the ranking in the second order of the images in the source web page resource.

10. The system of claim 9, wherein the additional image selection criteria includes image location on a rendered location of the source web page resource, and image labels for the image in the source web page resource.

11. The system of claim 7, wherein generating, from the first query, the second query comprises:
  determining whether the first query identifies a specific instance of an entity class; if the query identifies a specific instance of the entity class, selecting the identified specific instance as the second query; or
  if the query does not identify a specific instance of the entity class, selecting the first query as the second query.

12. The system of claim 7, wherein generating, from the first query, the second query comprises selecting the answer as the second query.

13. A non-transitory computer readable memory apparatus storing instructions executable by a data processing apparatus and that upon such execution cause the data processing apparatus to perform operations comprising:
  receiving, by the data processing apparatus, a first query that is determined to be a question query for which a corresponding answer is to be provided in response to the first query, wherein the corresponding answer is textual data extracted from a source web page resource, and wherein the source web page resource is not yet identified by an answer system for extracting the corresponding answer to serve in response to the first query, wherein the answer system is a system that is separate from the data processing apparatus, and in response:
  generating, by the data processing apparatus and from the first query, a second query; causing, by the data processing apparatus, a search of a plurality of resources of a first corpus of web page resources to be done using the second query as input, wherein the first corpus of web page resources are web page resources that, when rendered, include images and textual data rendered with the images;
    receiving data indicating a set of web page resources determined to be responsive to the second query and ranked according to a first order indicative of the responsiveness of the web pages to the second query;
    causing, as part of a search operation responsive to the first query to identify an image to provide with the corresponding answer and that is initiated after the first query is provided and before the source web page resource is identified by the answer system to extract the textual data for the corresponding answer, a search for images that are included in the web pages in the set of web page resources, wherein the search for images is constrained to the images that are included in the web pages in the set of web page resources determined to be responsive to the second query;
  generating, in response to the search for images that are included in the web page resources determined to be responsive to the second query, a set of images from the images that are included in the web pages of the set of web pages, the set of images ranked in a second order indicative of a responsiveness of each image to the second query;
  selecting, from the set of images and based in part on the search for images in the set of web page resources, an image to be provided with the answer in response to the query, the selecting comprising:
    determining, based on data received from the answer system, the source web page resource from which the answer system extracted the corresponding answer from the textual data of the source web page resource in response to receiving the first query; and
  in response to the data received from the answer system, determining that the source web page resource is a resource that is included in the set of web page resources determined to be responsive to the second query and that the source web page resource includes images in the set of images, and in response:
    selecting the image to be provided from among the images in the source web page resource according to the second order indicative of the responsiveness of each image to the second query; and
  providing, by the data processing apparatus, and with the answer, the image in response to the first query.

* * * * *